United States Patent [19]

Lehureau et al.

[11] Patent Number: 5,125,052
[45] Date of Patent: Jun. 23, 1992

[54] OPTICAL DEVICE FOR THE OBSERVATION OF AN ELONGATED OBJECT

[75] Inventors: Jean-Claude Lehureau, Saint Genevieve Des Bois; Sophie Neubert, Les Ulis, both of France

[73] Assignee: Thomson-CSF, Puteaux, France

[21] Appl. No.: 448,509

[22] Filed: Dec. 11, 1989

[30] Foreign Application Priority Data

Dec. 9, 1988 [FR] France .................. 88 16218

[51] Int. Cl.⁵ .............................................. G02B 6/32
[52] U.S. Cl. ........................................ 385/33; 359/668; 359/710
[58] Field of Search ............... 350/96.18, 420, 423, 350/96.20, 96.17, 433; 385/33, 34, 35, 49; 359/668, 670, 710

[56] References Cited

U.S. PATENT DOCUMENTS

| | | | |
|---|---|---|---|
| 3,317,267 | 5/1967 | Offner | 350/420 |
| 3,822,932 | 7/1974 | Humphrey | 350/420 X |
| 4,190,322 | 2/1980 | Wortley | 350/433 X |
| 4,203,652 | 5/1980 | Hanada | 350/433 X |
| 4,298,271 | 11/1981 | Sugiura et al. | 350/420 X |
| 4,318,594 | 3/1982 | Hanada | 350/433 |
| 4,530,574 | 7/1985 | Scifres et al. | 350/420 |
| 4,610,515 | 9/1986 | Tanaka | 350/474 |
| 4,657,352 | 4/1987 | Suda et al. | 350/432 |
| 4,900,120 | 2/1990 | Caviglia et al. | 350/96.18 |

FOREIGN PATENT DOCUMENTS 59-208523 11/1984 Japan .

OTHER PUBLICATIONS

IBM Technical Disclosure Bulletin, vol. 10, No. 11, Apr. 1968, p. 1750, New York, US: B. R. Brown et al.: "Magnetic recording and optical readout system".
Applied Optics, vol. 21, No. 6, Mar. 1982, pp. 999-1003, Optical Society of America, New York, US: D. T. Moore et al.: "Ray tracing in anamorphic gradient-index media".

Primary Examiner—John D. Lee
Assistant Examiner—Phan T. Heartney
Attorney, Agent, or Firm—Oblon, Spivak, McClelland, Maier & Neustadt

[57] ABSTRACT

For the observation of an elongated object or an elongated zone (12) of an object with a lens (20, 20', 54), in the vicinity of this object or zone (12), a cylindrical lens (23) is used whose axis (Ox) extends along the largest dimension of the object or the zone. In this way, the observation is performed with a large resolution on an extended field.

15 Claims, 4 Drawing Sheets

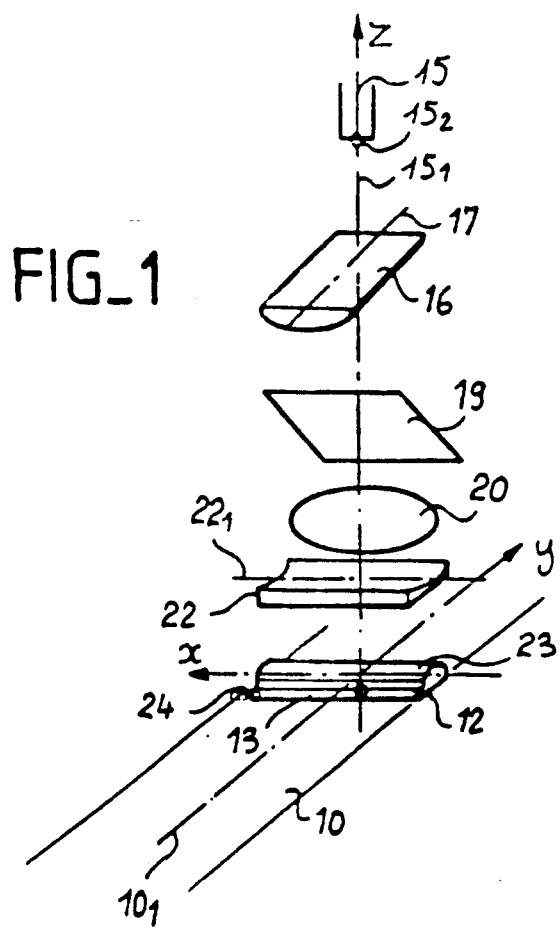
FIG_1
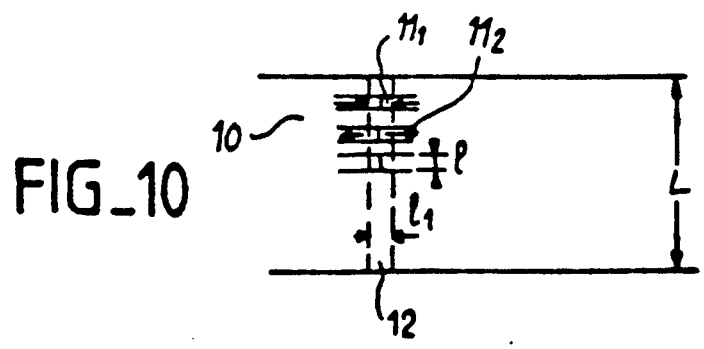
FIG_10
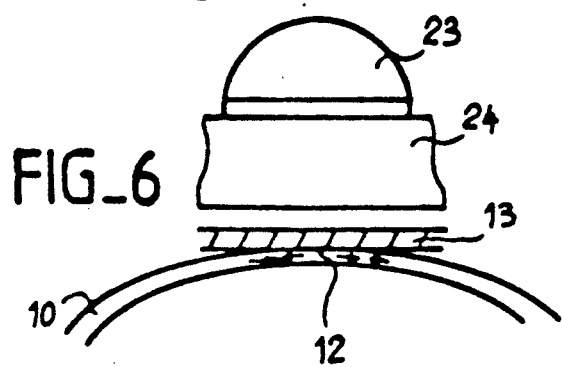
FIG_6

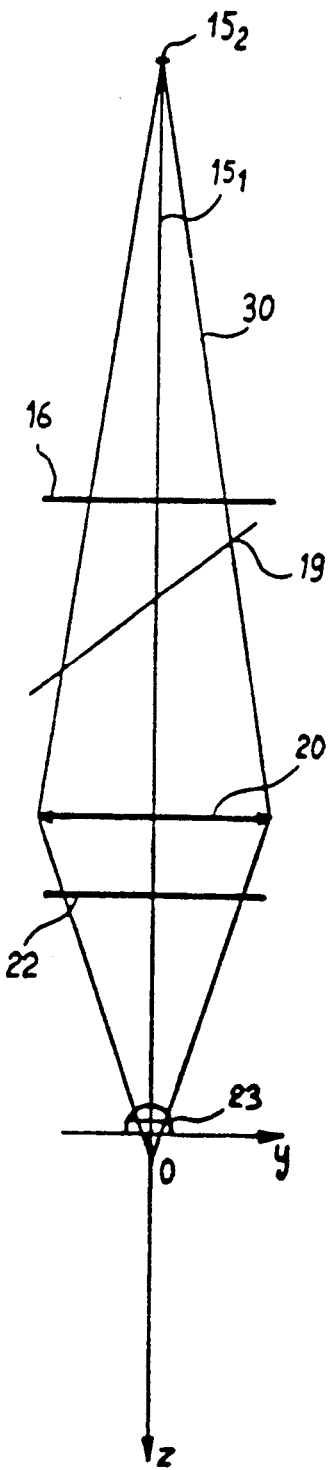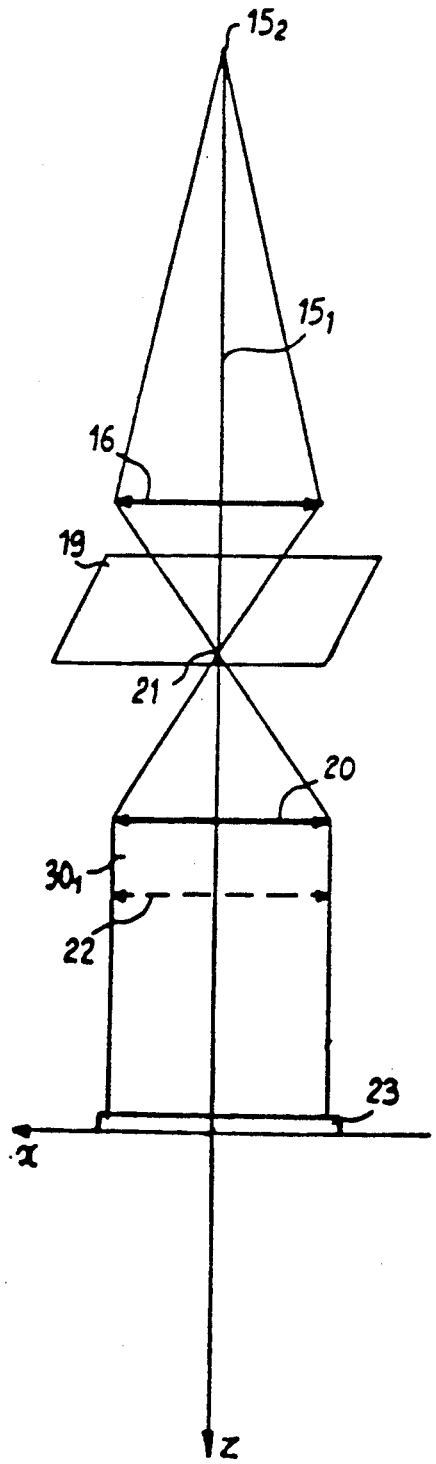

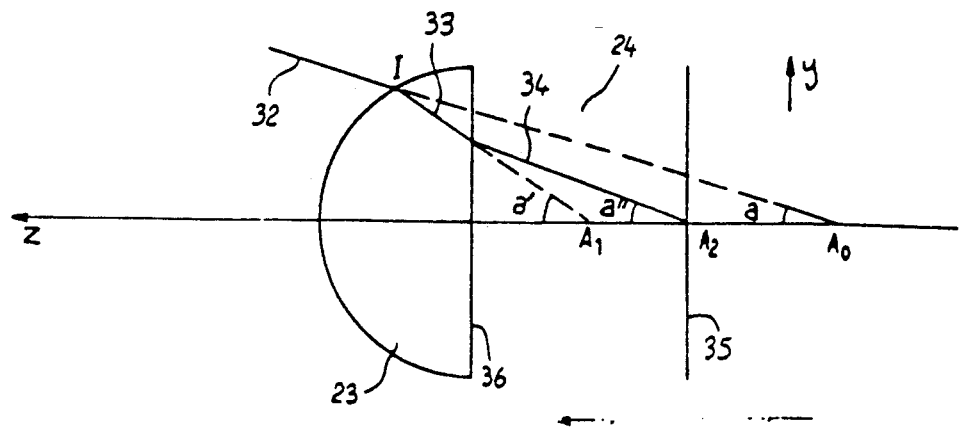
FIG_4
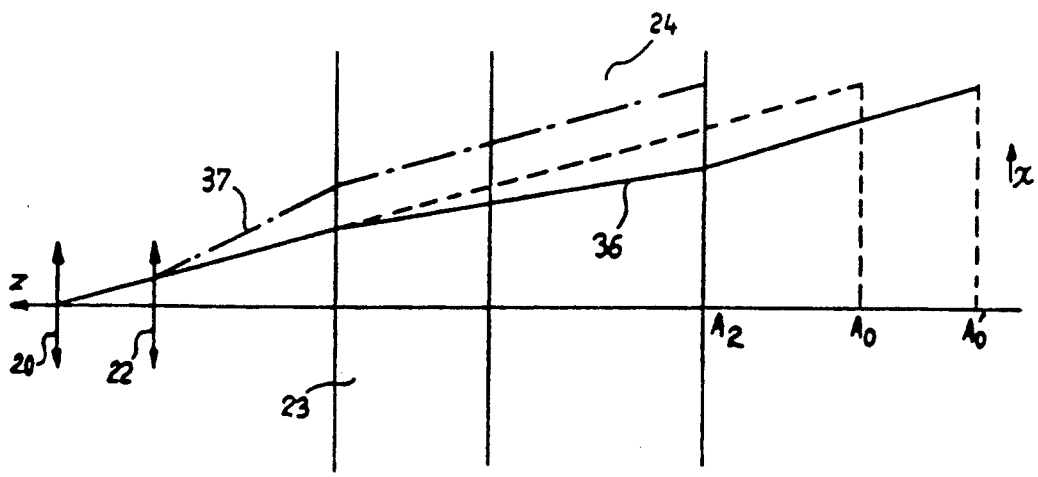
FIG_5

FIG_7
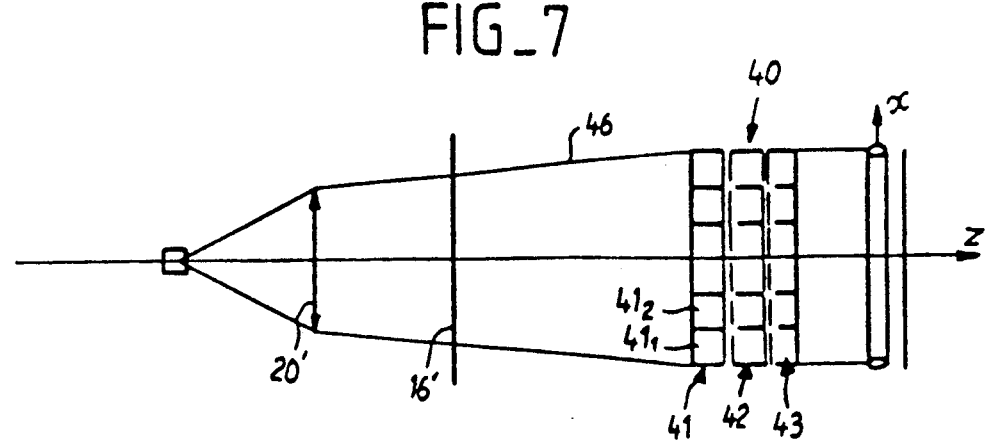
FIG_8
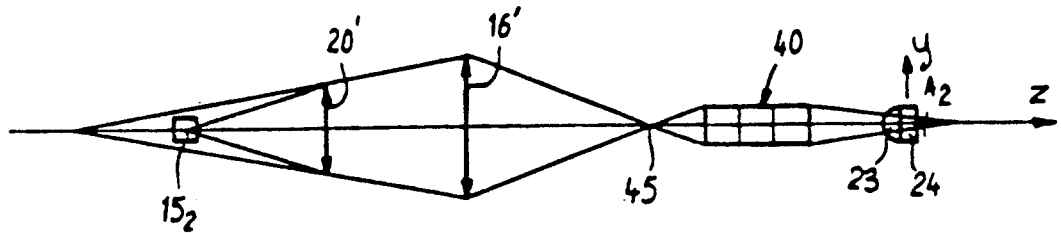
FIG_9
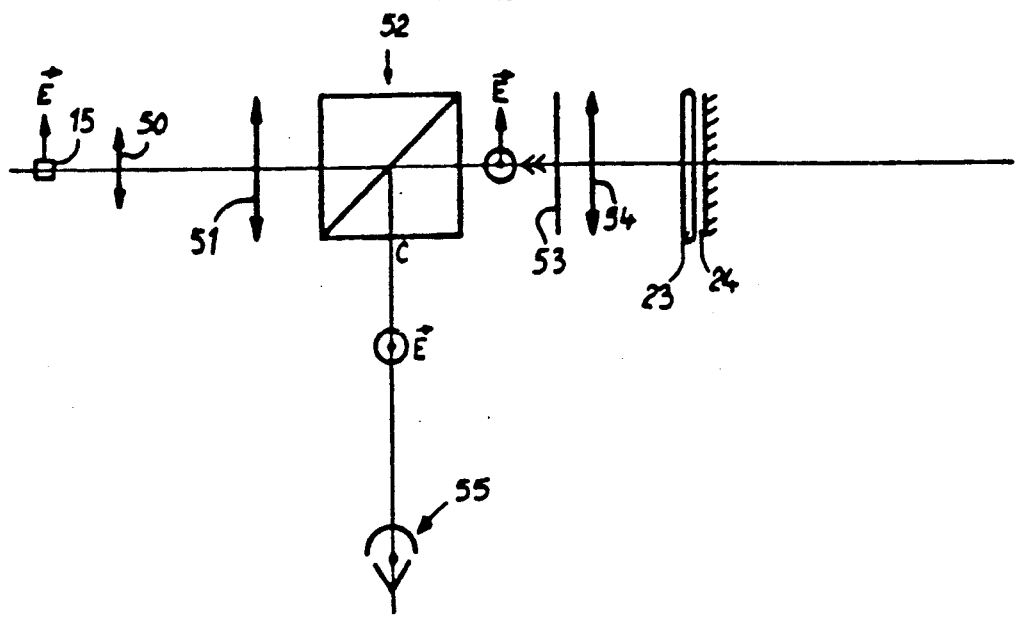

OPTICAL DEVICE FOR THE OBSERVATION OF AN ELONGATED OBJECT

BACKGROUND OF THE INVENTION

1. Field of the Invention

The invention relates to an optical device for the observation of an elongated object, i.e. exhibiting dimensions much larger in one direction than in another.

2. Discussion of Background

The observation of elongated objects (or elongated zones) is a common problem. By way of example, the optical reading of magnetic tapes as described in French patent 84 08252 published under No. 2 569 072 will be cited. This patent refers to the reading on a magnetic tape of a large number of tracks, for example 1,500, all parallel to the longitudinal direction of the tape. The data contained on these tracks can be read simultaneously. If an element of data is recorded on the track over a length on the order of one micron and if the width of the tape is on the order of one centimeter, it is necessary to observe a zone 1 micron wide and 1 cm long in order to simultaneously read all of the tracks.

The observation of such elongated objects is difficult because of diffraction whereby as the field of observation of an optical system increases, its resolution decreases.

It is known that the digital opening α of an optical system and the resolution d are related by the following equation:

$$d = \frac{1.22\lambda}{\alpha}$$

in which λ is the wavelength of the light; it also is known that the larger the digital opening, the smaller the extent of the field of observation.

Thus, a good resolution was seemingly incompatible with an extended field. As an example, a resolution of about one micron when the object extends to 1 cm was very difficult to obtain.

SUMMARY OF THE INVENTION

Accordingly, it is an object of the invention to obtain a large resolution with an extended field.

The object is obtained by applying to the object, optionally by a transparent plate, a cylindrical lens or the like whose axis is along the large dimension of the object. In a plane passing through the axis of the cylindrical lens, the convergence, and therefore the magnification, si insignificant while in a plane perpendicular to the axis, i.e. along the small dimension of the object to be observed, the lens is convergent with a magnification which increases the resolution. However, the focal distance of this cylindrical lens (distance considered along the small dimension of the object) is small relative to the focal distance of the objective lens or observation so that this cylindrical lens does not cause an appreciable aberration tot his lens. The focal distance of he cylindrical lens is preferably between 100 microns and 1 mm and the ratio between the focal distance of the objective and that of the cylindrical lens is preferably between 10 and 100.

The elongated cylindrical lens, of practically the same dimensions as the object to the observed, can consist of a single optical fiber which, preferably, exhibits a flat surface along its length. The flat surface is, for example, along a diametral plane.

This optical fiber, exhibiting or not a flat surface along its large dimension, can be glued to an elongated, transparent plate.

As indicated above, the cylindrical lens forms part of an optical device for observation, and optionally illumination, of the object.

To this cylindrical lens, another cylindrical lens, of more standard embodiment, can be joined, for observation, to correct the astigmatism introduced by the first cylindrical lens covering the object to be examined. The interference introduced by the first cylindrical lens is small, the convergence of the cylindrical lens for correction is also small.

BRIEF DESCRIPTION OF THE DRAWINGS

Other characteristic and advantages of the invention will come out with the description of some of its embodiments, the latter being performed by referring to the accompanying drawings in which:

FIG. 1 is a perspective diagrammatic view of an optical device according to the invention, FIG. 2, 3, 4 and 5 are diagrams explaining the operation of the device of FIG. 1, FIG. 6 is a diagram referring to an application of the device of the invention, FIGS. 7 and 8 are diagrams similar to those of FIGS. 2 and 3 but for another embodiment, FIG. 9 is an optical device according to the invention for the observation by reflection of an object with a device according to the invention, and FIG. 10 is a diagram of a magnetic tape readable with a device according to the invention.

DETAILED DESCRIPTION OF THE PREFERRED EMBODIMENTS

The examples that will be described in reaction to the figures refer to the reading of a magnetic tape 10 (FIG. 10) on which binary data is recorded along longitudinal tracks $11_1$, $11_2$, etc. . . . Track 10 has a total width L on the order to 1 cm. Width 1 of each track 11 is on the order of 6 microns in the example, while on each track 11, the span of data is on the order of one micron.

The reading of the data on track 10 is performed simultaneously on the unit of tracks by observing at each moment a zone 12 covering width L of tape 10 and length $1_1$ (dimension along the direction of the tape) on the order of one micron.

For this reading of data in zone 12, an optical device is used which is of the type described in the above-mentioned French patent. For this purpose, tape 10 moves across a ferrite substrate 13 (FIG. 6). The various areas of tape 10 induce, in this ferrite substrate 13, magnetic domains which are observed optically, because of the Faraday effect, to be described later in conjunction with FIG. 9.

FIG. 1, which shows a portion of the device for observation of the substantially linear elongated zone 12, will now be described.

In order to light the zone 12, a laser 15 lights a cylindrical lens 16 whose axis 17 is parallel to longitudinal direction $10_1$ ($O_y$) of tape 10.

Axis $15_1$ of the beam emitted by laser 15 is perpendicular to the plane of zone 12 and intersects it at its center.

Cylindrical lens 16 is followed by a semitransparent plate 19 which is used for observation and which is inclined at 45° relative to axis $15_1$. Positioned after plate 19 is a microscope lens 20 whose position is such that the image of point formed by a virtual source $15_2$, constituted by the positioning of the laser relative to lens 20, is practically in the plane of tape 10, as shown in FIG. 2. Further, first focal point 21 (FIG. 3) of lens 20 has the same abscissa on axis $15_1$ as the second focal point of cylindrical lens 16, in the plane xOz which contains axis $15_1$ and longitudinal direction Ox of zone 12.

This lens 20 is followed by another cylindrical lens 22 with axis $22_1$ parallel to longitudinal direction Ox of zone 12. Finally, an elongated cylindrical lens 23 having a length at least equal to that of zone 12 to be observed or analyzed is joined, for example by gluing, to a transparent plate 24 of the same length and at least the same width. The plate 24 is placed on ferrite plate 13 at right angles with zone 12 of the tape.

The diagrams of FIGS. 2, 3, 4 and 5 are used to explain the operation of the device shown in FIG. 1.

The diagram of FIG. 2 illustrates the operation in plane yOz, i.e. in the plane passing through longitudinal axis $10_1$ of tape 10 and perpendicular to the latter. FIG. 3 shows the operation in plane xOz, i.e. in the plane pass through longitudinal axis of elongated cylindrical lens 23 and perpendicular to tape 10.

In plane yOz (FIG. 2), laser beam 30 coming from source $15_2$ is not deflected by cylindrical lens 16 but rather goes through semitransparent plate 19 and is concentrated on tape 10 by lens 20 and by cylindrical lens 23 which is convergent in plane yOz.

In plane xOz (FIG. 3), cylindrical lens 16 is convergent and the image of source $15_2$, provided by lens 16 is at focal point 21 of lens 20.

Thus, in this plane xOz, lens 20 returns laser beam $30_1$ in the form of a parallel beam of sufficient width to cover the entire length of cylindrical lens 23. In this plane, cylindrical lens 23 has practically no convergence effect.

In the absence of cylindrical lens 23, the resolution in direction Ox would be $\lambda/\alpha$, $\alpha$ being the digital opening of cylindrical lens 16 while in direction Oy, the resolution would be $\lambda/\alpha'$, $\alpha'$ being the digital opening of lens 20.

The presence of the unit of cylindrical lens 23 and the plate 24 with parallel faces, does not modify the resolution in direction Ox. On the other hand, in direction Oy, the resolution is increased proportionally to magnification g of the unit of cylindrical lens 23 and plate 24 with parallel faces.

FIG. 4 shows a diagram of light rays in plane yOz for cylindrical lens 23 and plate 24. An incident light ray 32 forming an angle a with axis Oz is refracted at 33 inside lens 23 with refraction index $n_1$ and then forms an angle a' with axis Oz. This ray 33 undergoes a refraction when it penetrates plate 24 and therefore changes direction. In plate 24, ray 34 forms an angle a" with axis Oz.

The magnification of unit 23, 24 is:

$$g = \frac{a}{a''}$$

The optical system is such that image $A_2$ of source $15_2$ is in output face 35 (FIG. 4) of plate 24.

For an incident digital opening $\alpha = 0.1$ of cylindrical lens 16, a unit can easily be made of cylindrical lens 23 and plate 24 having a magnification up to at least approximately 6.5. In other words, the resolution therefore can be increased easily in direction Oy by this same amount.

In the preferred embodiment, cylindrical lens 23 consists of a single optical fiber which has been truncated by polishing to exhibit a flat surface 36, for example in a diametral plane. The optical fiber is of ordinary type, with a constant index $n_1$.

Zone 12 lit by the laser beam returns an image through plate 24, cylindrical lens 23, cylindrical lens 22 and lens 20 to plate 19. The latter constitutes a mirror reflecting the light rays to a line of CCD detectors (not shown). Mirror 19 forms an image of line 21 on said CCD detectors.

Cylindrical lens 22 corrects the astigmatism caused by the unit of elongated cylindrical lens 23, plate 24.

This astigmatism defect is clearly shown in FIGS. 4 and 5. In plane yOz, the image of source $15_z$ is at point $A_2$ on face 35 of plate 24 while in plane xOz (FIG. 5) the image is shifted to point $A'_0$.

Cylindrical lens 22 has a focal distance and a position such that in plane xOz, image $A'_0$ has, on axis Oz, the same abscissa as image $A_2$. In FIG. 5, the path of the light rays has been shown in solid lines 36, as if cylindrical lens 22, where the formation of an image $A'_0$ is then seen, is not considered. Path 37, in dot-dash lines, corresponds to the real path in the presence of cylindrical lens 22 where the definitive image is formed at $A_2$ in plane xOz.

The assembly is such that it makes it possible to correct easily the spherical aberrations. The spherical aberration of an optical assembly stems from the fact that the convergence along the optical axis is not the same as the convergence along the directions deviating from the optical axis.

With the assembly of the invention, the sphericity aberration is introduced principally by fiber 23 and plate 24.

If indexes $n_1$ of fibers 23 and $n_2$ of plate 24 are of different values, the spherical aberration introduced by cylindrical lens 23 is positive (increase of the convergence relative to the convergence of the paraxial beam) while the aberration introduced by plate 24 is negative (decrease of the convergence relative to the convergence of the paraxial beam). This, the spherical aberration can be minimized by a suitable choice of thicknesses, i.e. dimensions along axis Oz, of the fiber and the plate.

The sphericity aberration can be completely corrected in practice by choosing to make cylindrical lens 23 of an optical fiber whose core exhibits an index smaller than that of the cladding.

For example, an optical fiber with radius of 130 microns, constant index $n_1 = 1.45$ and polished so that its thickness in direction Oz is equal to the radius, is glued to a plate 24 with index $n_2 = 1.964$ (gadolinium-gallium garnet). This provides a standard divergence of spherical aberration of 0.16 with a magnification of 4 and an incident digital opening of 1.1.

If plate 24 has an index $n_2 = 1.45$, under the same conditions, the standard divergence of spherical aberration is 0.37 $\lambda$.

For lens 20, the interference that cylindrical lens 23 introduces in plane yOz is small. It thus is not necessary to take special precautions for correcting the aberrations for lens 20. Moreover, this aberration is, for the observation on the detector or detectors, corrected by lens 22 with slight vergence.

The variant shown in FIGS. 7 and 8 differs from the embodiment described above particularly in relation to FIG. 1 by lens 20' being upstream from cylindrical lens 16' and by an optical assembly 40 being provided making it possible to increase the field without changing the resolution in direction Oy. In other words, the embodiment shown in FIGS. 7 and 8 makes possible the observation of a greater length (direction Ox) of zone 12.

Assembly 40 consists of three units 41, 42 and 43 of optical fibers of "selfoc" type. Each unit 41, 42, 43 is formed from a multiplicity of fibers $41_1$, $41_1$, etc. . . . of axes parallel to axis Oz and in plane yOz. The number of fibers is the same in units 41, 42 and 43, and the arrangement is such that each fiber of a unit corresponds to a fiber from two other units of the same axis. The number of fibers in a unit is, for example, six. A "selfoc" fiber is an optical fiber with an index varying according to its length. It is stigmatic along a given span. Each fiber element constitutes a lens whose focal distance f is a function of its length.

Assembly 40 is such that its magnification is equal to +1 and its purpose is both to light zone 12 and to form an image on a line of detectors as described above.

In plane yOz (FIG. 8), the unit of lens 20' and cylindrical lens 16' forms an image 45 of laser source $15_2$. Assembly 40, of magnification +1, with fiber 23 and plate 24 form an image of point 45 at abscissa $A_2$.

In plane xOz (FIG. 7), lens 16' has no effect, and the opening of beam 46 reaching assembly 40 is small, which makes possible in direction x a large field of observation and therefore, as mentioned above, a greater length of observation of zone 12.

In an example, the assembly makes it possible to light a length of 2 cm in direction Ox with a digital opening of 0.1 and a distance of 10 cm between source $15_2$ and assembly 40.

If a laser diode whose divergence angle of the beam is 0.5 radian is used, lens 20' of 10 mm focal distance decreases this divergence. The laser source then will be 8 mm from the lens and image point 45 is only 40 mm from this lens. In this case, the distance between laser 15 and assembly 40 will be 60 mm; thus the unit is compact.

FIG. 9 shows an assembly for the observation by reflection of zone 12 with a laser 15, a lens 50 and a cylindrical lens 51, a polarization separating cube 52, a phase-shifting plate 53, a focusing lens 54, optical fiber assembly 23 and plate 24, and a detection device 55 such as a camera or a line of CCD detectors.

Laser 15 emits a linearly polarized light beam (vector E in FIG. 9). The directions of polarization is preserved along the passage in cube 52. However, plate 53 turns the polarization by an angle $\beta$.

After reflection, the beam again is dephased by an angle by plate 53, and is then returned by cube 52 toward detector 55.

The amount of light collected by detector 55 is proportional to the sine of phase shift introduced by plate 53.

The phase shift can be introduced by object 12 itself. In this case, plate 53 can be dispensed with.

If an assembly 40 for increase of the field is used, polarization separating cube 52 is placed between the focal point of lens 16' and assembly 40.

It should be noted that if plate 24 exhibits a refraction index close to 2, it is preferable to observe the elongated object by reflection rather than by transmission because, in the latter case, a phenomenon of total reflection can occur which prevents or limits the transmission.

The device, in any of the embodiments according to the invention, increases the resolution in the smallest dimension. Further, it makes possible the obtaining of a light image, the lighting being multiplied by magnification g of the assembly with cylindrical lens 23.

In addition to the application, already mentioned, to the optical reading of magnetic tapes, the observation will be pointed out, in a more general way, on a line-by-line image, when the elongated cylindrical lens 23 is, for example, moved each time about 1 micron, or conversely, the object moved step by step by the one micron at each observation.

In an example corresponding to the first embodiment described in relation to FIG. 1, a field of observation in direction Ox of 1 cm has been obtained with a resolution of 7.8 microns in direction Ox and a resolution of 1.95 microns in the direction Oy, with a laser diode emitting a radiation of wavelength 0.78 micron a cylindrical lens and a focusing lens of digital opening 0.1, and a fiber 23 with index 1.45 polished in a diametral plane with a radius of 130 microns.

With the second embodiment (FIGS. 7 and 8), a resolution of the same value but with a field twice as large can be obtained with the same data.

The gluing of fiber 23 on plate 24 is performed, for example, with a thin film polymerizable glue UV radiation.

In all the embodiments, the optical system for observation is very simple. In the case of FIG. 1, it essentially comprises lens 20 and cylindrical lens 23. In the case of FIG. 7, it comprises lens 20' and cylindrical lens 40, and in the case of FIG. 9, lens 54 and cylindrical lens 23. This assembly is practically without aberration particularly because cylindrical lens 23 introduces a minimum of aberrations, and because the ratio between the focal distance of the lens and the focal distance of the cylindrical lens is large, preferably between 10 and 100.

What is claimed as new and desired to be secured by Letters Patent of the United States is:

1. A device for observation, with an observations lens, of an elongated object or an object elongated zone, said device comprising, in the vicinity of, or in contact with, the object or the zone: a first cylindrical lens including an axis extending along the largest dimension of said object or zone, so that the device magnifies the object insignificantly along the largest dimension and significantly along the smallest dimension of the object, and wherein the focal distance of said first cylindrical lens is small relative to the focal distance of said observation lens.

2. The device according to claim 1, wherein the ratio between the focal distance of the observation lens and the focal distance of said first cylindrical lens is between 10 and 100.

3. The device according to any one of claims 1 or 2, wherein the focal distance of the first cylindrical lens is between 100 microns and 1 mm and preferably on the order to 150 microns.

4. The device according to any one of claim 1 or 2, wherein the cylindrical lens consists of an optical fiber.

5. The device according to claim 4, wherein the optical fiber exhibits a flat surface parallel to its axis.

6. The device according to claim 5, wherein the flat surface or base plane comprises the axis of the optical fiber.

7. The device according to any one of claim 1 or 2, wherein the first cylindrical lens is joined to a transparent plate having substantially the same dimensions as said object or said zone to be observed.

8. The device according to claim 7, wherein the refraction indexes of said first cylindrical lens and said transparent plate are different.

9. The device according to claim 7, wherein the cylindrical lens is glued to said transparent plate (24).

10. The device according to any one of claims 1 or 2, further comprising a second cylindrical lens with an axis parallel to that of said first cylindrical lens said second cylindrical lens being intended to correct the astigmatism caused by said first cylindrical lens.

11. The device according to any one of claims 1 or 2, further comprising, for lighting the object or zone through said first cylindrical lens, a light source, a shaping cylindrical lens for rectilinear shaping of the light beam and a focusing lens, axis of said shaping cylindrical lens for shaping the light beam being perpendicular to the axis of said first cylindrical lens in the vicinity of the object or zone to be observed.

12. The device according to claim 11, wherein, in a plane passing through said axis of said shaping cylindrical lens, an image of a source relative to an optical unit comprising said focusing lens and said first cylindrical lens, is on said object or zone or in the vicinity of the object or zone and, in a perpendicular plane, an image of a source relative to said shaping cylindrical lens is at a focal point of said focusing lens.

13. The device according to claim 4, wherein the index of the core of said optical fiber is smaller than the index of the cladding of said optical fiber.

14. The device according to any of claims 1 or 2 further comprising, before said first cylindrical lens placed in the vicinity or against the object or zone, an optical assembly for enlargement of the field of observation.

15. The device according to claim 14, wherein said assembly for enlargement of the field comprises a unit of lines of optical fibers with index gradient along their length, the magnification of said assembly being equal to 1.

* * * * *